Figure 1A:
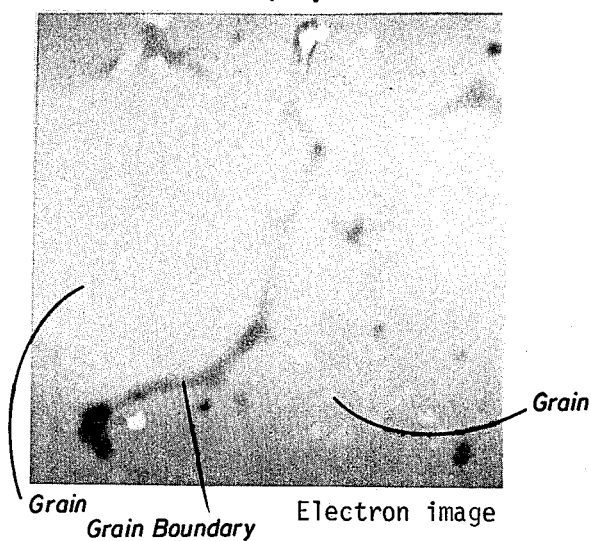
Figure 1B:
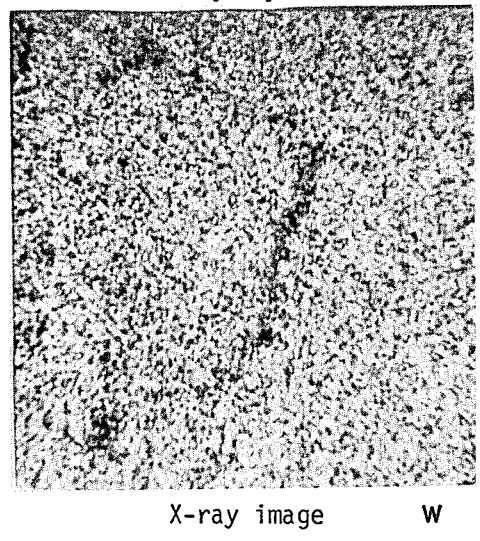
Figure 1C:
Figure 1D:
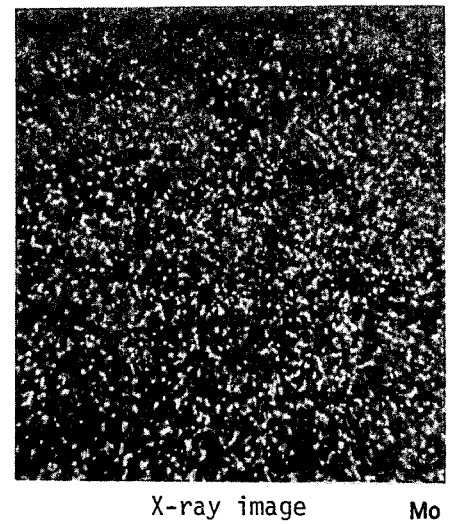
Figure 1E:
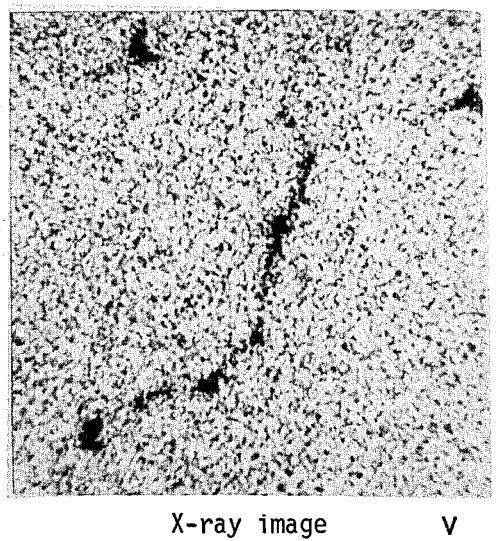

United States Patent [19]

Brown et al.

[11] 4,177,324

[45] Dec. 4, 1979

[54] HARD FACING OF METAL SUBSTRATES USING MATERIAL CONTAINING V, W, MO, C

[75] Inventors: Harry J. Brown, Lewiston; Kuldip S. Chopra, Grand Island, both of N.Y.

[73] Assignee: Union Carbide Corporation, New York, N.Y.

[21] Appl. No.: 920,827

[22] Filed: Jun. 30, 1978

[51] Int. Cl.² .......................... B32B 15/16; C23C 1/00
[52] U.S. Cl. ......................................... 428/627; 75/241; 427/205; 427/212; 427/217; 427/328; 427/329; 428/679; 428/680; 428/932
[58] Field of Search ................. 75/239, 240, 241, 242, 75/236, 203, 170, 0.5 BC; 428/627, 678, 679, 680, 932, 472; 148/31.5; 427/205, 212, 214, 216, 217, 327, 328, 329

[56] References Cited

U.S. PATENT DOCUMENTS

| 2,967,349 | 1/1961 | Humenik, Jr. et al. | 75/236 |
| 4,049,380 | 9/1977 | Yih et al. | 75/170 |
| 4,055,742 | 10/1977 | Brown et al. | 219/145 |
| 4,066,451 | 1/1978 | Rudy | 75/170 |

FOREIGN PATENT DOCUMENTS 323230  2/1972  U.S.S.R. ..................... 75/170

*Primary Examiner*—L. Dewayne Rutledge
*Assistant Examiner*—Michael L. Lewis
*Attorney, Agent, or Firm*—John R. Doherty

[57] ABSTRACT

Hard-facing of iron and iron base alloy substrates is disclosed using a hard facing material in the form of granules consisting essentially of grains of chemically combined vanadium, tungsten, molybdenum, and carbon bonded by a binder metal of nickel-molybdenum alloy.

2 Claims, 5 Drawing Figures

Electron image

X-ray image   W

X-ray image   Ni

X-ray image   Mo

X-ray image   V

HARD FACING OF METAL SUBSTRATES USING MATERIAL CONTAINING V, W, MO, C

The present invention relates to the hard facing of iron base alloy substrates. More particularly, the present invention relates to the hard facing of iron based alloy substrates using as the hard-facing material a vanadium, tungsten, and molybdenum containing composition having a nickel-molybdenum binder to provide improved wear and impact resistance.

Hard facing of substrates, e.g. metal surfaces*, is a common industrial practice, for example, cast particulate tungsten carbide ($W_2C$-WC) or cobalt bonded WC, usually encased in a steel tube, is deposited by hard facing techniques on iron base alloys in making wear resistant cutters, earth moving equipment and the like. It has been found, however, that due possibly to the inherently different physical properties of base metal and tungsten carbide, the hard facing material has a tendency to become unevenly distributed in the molten portion of the metal substrate and as a result, undesired variations in hardness can occur in the resulting solidified hard-faced surfaces.

*The Oxy-Acetylene Handbook 11th Edition, Linde Air Products Division of Union Carbide Corporation, also Welding Handbook Third Edition, American Welding Society and Mechanized Surfacing With Alloy Materials —R.S. Zuchowski and J. H. Neely. ASM Review of Metal Literature 1958

Also, during the deposition of both cast and cobalt-bonded tungsten carbide on iron and steel substrates, the molten iron in the substrate dissolves some of the tungsten carbide and upon cooling results in the precipitation of the mixed carbides $(FeW)_6C$ and $Fe_3W_3C$ according to the formula $3WC+9Fe \rightarrow Fe_3W_3C + 2Fe_3C$, thus resulting in substantial depletion of the deposited tungsten into less wear resistant phase.

In instances where tungsten carbide is employed in hard facing, due to the high density of tungsten carbide, a relatively large weight of tungsten carbide is required for adequate hard facing.

It is accordingly an object of the present invention to provide a hard-facing material containing vanadium in combination with tungsten, molybdenum and carbon to produce a hard-faced surface having improved wear resistant properties at least comparable to those provided by the use of conventional tungsten carbide.

Other objects will be apparent from the following description and claims taken in conjunction with the drawing which shows electron microprobe results (original magnification 400×) of hard facing material in accordance with the present invention.

The present invention is directed to an improvement in conventional methods of hard-facing iron and iron base alloy substrates by employing as the hard facing material a solid material in the form of particles, e.g. granules, consisting essentially of grains of chemically combined vanadium, tungsten, molybdenum, and carbon, the grains being bonded together by a nickel base alloy containing from 0.02 to 10% molybdenum, preferably from 0.02 to 2% molybdenum.

The aforesaid grains consist essentially of vanadium carbide having from about 10 to 50% by weight tungsten in solid solution and from about 1 to 4% by weight molybdenum in solid solution. The vanadium carbide may be VC, $V_2C$, $V_4C_3$ or a mixture of such carbides. The nickel-molybdenum alloy binder phase is from about 1-4% by weight of the grain material of the granules.

In a preferred hard facing material in accordance with the present invention the grains contain 54 to 59% by weight V, 20 to 25% by weight W, 1 to 3% by weight Mo, 12.5 to 14% C, 1 to 3% Ni and the metal binder phase is about 1 to 3% by weight of the grain material, the binder phase being from 90 to 99.98% nickel balance essentially molybdenum.

While various techniques can be used for producing the above described hard facing material from conventional starting materials, including elemental vanadium, tungsten, molybdenum, nickel and carbon, the preferred form of the hard facing material for use in the method of the present invention is a particulated cold pressed and sintered, e.g. under hydrogen atmosphere or vacuum, and subsequently granulated material illustrated by example in the present specification. In the example, the starting vanadium, tungsten, molybdenum, nickel and carbon materials are blended, compacted, and sintered under vacuum, e.g. about 100 microns at elevated temperatures, e.g. about 1200°–1600° C. and for periods, e.g. ½ to 3 hours, sufficient to produce material as aforedescribed.

A particular embodiment of the present invention comprises a hard facing rod in conventional form for use in hard facing iron and iron base alloy metal substrates, e.g. mild steel, Hadfield steels and the like. Such a hard facing rod comprises a metallic sheath or tube formed of the usual metals for such purposes such as iron, steel, aluminum, copper and the like containing therein a hard facing composition as previously described.

Hard facing in accordance with the present invention can be used with known gas and electric welding techniques, e.g. gas welding, arc welding and other practices described in the "Master Chart of Welding Processes"—American Welding Society (1969), using conventional fluxes.

The hard facing method of the present invention can also be used with known plasma flame spraying or coating techniques ("Flame Spray Handbook" Volume III—METCO INC. (1965).

A particularly advantageous embodiment of the present invention are those hard facing practices which involve the forming of a puddle of molten iron base alloy, e.g. steel on a substrate, and the dropping of particles, i.e. granules of hard facing material into the puddle, e.g. sized about 12 to 80 mesh to provide, upon solidification of the puddle, a hard facing deposit comprising a steel matrix with particles of the hard facing material of the present invention uniformly distributed and bonded therein. Examples of such practices are "bulk" TIG (tungsten inert gas) and MIG (metal inert gas) techniques wherein the hard facing material is dropped into a smaller metal puddle.

In the hard facing of metal substrates in accordance with the present invention by the above-noted conventional techniques the metal substrate and the applied hard facing material become metallurgically bonded.

The resulting hard facing deposit is a matrix of iron base alloy, e.g. steel in which particles of the hard facing material of the present invention are embedded by metallurgical bonding.

The following example illustrates material for use as hard-facing compositions in accordance with the present invention:

EXAMPLE I

The following materials were used to obtain a cold pressed, sintered hard-facing composition containing about 56% by weight V, 22.25% by weight W, 2.2% by weight Mo, 2.2% by weight Ni, 13.5% C.

(a) 521.5 lbs. of a commercially available material (Union Carbide Corporation) containing mixed $V_2C+VC$, sized 65 mesh and finer having the following analysis:

| | |
|---|---|
| 85.42% | V |
| 13.02% | C |
| 0.75% | O |

Balance moisture and incidental impurities.

(b) 40.5 lbs. Acheson* brand G39 graphite powder, sized 200 mesh and finer.
*Trademark of Union Carbide Corporation (c) 15 lbs. of nickel powder, extra fine grade from African Metals Corp.

(d) 169 lbs. of UCAR* tungsten metal powder (2.2 micron).

(e) 15 lbs. of molybdenum metal powder sized 4 micron.
*Trademark of Union Carbide Corporation The powders were placed in a water-cooled 37 in. dia. by 48 inch steel ball mill with 4470 lbs. of ⅜in. dia. steel balls and turned at 28 RPM for 12 hours. After 12 hours milling, the material was cold pressed in a roll compactor and the cold pressed material was crushed into granules sized 30 to 80 mesh. The granules were placed in graphite boats and sintered in vacuum of 100 microns at 1400° C. for forty hours. After sintering the granules were lightly bonded together but were easily separated in a jaw crusher. The resulting material was formed of granules containing grains of chemically combined vanadium, tungsten, molyddenum and carbon; the grains were bonded to each other by a predominantly nickel-molybdenum alloy. The material had the following analysis by weight:

| | |
|---|---|
| V | 56.10% |
| W | 22.26% |
| Mo | 2.22% |
| Fe | 1.62% |
| Ni | 2.24% |
| C | 13.48% |
| O | 0.02% |
| N | <0.10% |

Electron microprobe analysis of material prepared following the procedure of the Example are shown in the FIGURES of the drawing. As can be seen from the photographs of the drawing, vanadium, tungsten and molybdenum are homogeneously dispersed in solid solution throughout the grain while a major portion of the nickel (more than 95% by weight) is present at the grain boundaries.

Cold pressed and sintered material prepared following the procedure of the example was employed as a hard facing material in the following manner:

Granules 30×80 mesh were packed into 12 in. long ¼ in. O.D., 0.19 in. I.D. mild steel tubing. The granules comprised about 45% by weight of the rod. The rod was fluxed for oxyacetylene welding and deposited by oxyacetylene techniques with a minimum of penetration on a mild steel substrate with a carburizing flame.

The resulting hard-faced surfaces were tested for abrasion resistance using a rubber wheel-sand wear and abrasion test. The wear and abrasion test was as follows: A 1 inch×3 inch×½ inch thick steel substrate is hard faced by depositing a hard faced material thereon and the hard faced surface is ground flat. A 9 ⅛ inch O.D. by ½ inch wide neoprene circular disk (durometry hardness shore A 50-60) is used with the hard faced surface being loaded with 38 ft.-lbs. of force against the neoprene disk. Silica sand (sand blast sand size 2, QROK) is fed in excess between the neoprene disk and the hard faced surface with the neoprene disk being turned at 200 RPM for 200 revolutions. The specimen under test is weighed before and after and the procedure is repeated until a constant weight loss is obtained for repeated tests and this weight loss is used as a measure of wear and abrasion resistance The results obtained are shown in Table I hereinbelow together with microhardness valves of the V, W, Mo, C, grains of the hard facing material. Also shown in Table I are results obtained for a hard facing material prepared as in the Example except that 3% by weight cobalt was used as the binder phase instead of Ni-Mo.

| | Wear Test Wgt. Loss Mg. | $R_A$ Hardness |
|---|---|---|
| % V  % W  % C + 3Co | 0.046 | 86.3 |
| % V  % W  % C + 2Ni2MO | 0.024 | 87.0 |

As can be seen from the results of Table I, the hard facing material of the present invention provides substantially increased wear resistance over a similar material using cobalt as the binder phase.

In addition to conventional fluxing agents other materials in amounts of up to 10% are compatible with and effective in the hard facing method of the present invention such as the borides V, Zr, Fe, Cr; chromium carbides of V, and VW; anhydrous borax or boric acid, FeSi, FeMn.

The mesh sizes referred to herein are Tyler Screen sizes.

What is claimed is:

1. In a method for hard facing a surface of an iron or iron base alloy substrate by forming a bond between said surface and a hard-facing material, the improvement which comprises employing as hard-facing material solid particles consisting essentially of grains of vanadium carbide having in solid solution from about 10 to 50% by weight tungsten and about 1 to 4% by weight molybdenum and having about 1 to 4% by weight of binder metal between said grains, said binder metal consisting essentially of 90 to 99.98% nickel and 0.02 to 10% molybdenum.

2. A hard faced metal surface formed by providing molten iron or iron base alloy on a portion of an iron or iron base alloy metal substrate, applying to the molten metal a solid composition consisting essentially of grains of vanadium carbide having in solid solution from about 10 to 50% by weight tungsten and about 1 to 4% by weight molybdenum and having about 1 to 4% by weight of binder metal between said grains, said binder metal consisting essentially of about 90 to 99.98% nickel and 0.02 to 10% molybdenum.

* * * * *